United States Patent
Kwon et al.

(10) Patent No.: US 12,345,427 B2
(45) Date of Patent: Jul. 1, 2025

(54) SYSTEM AND METHOD FOR PREDICTING USER OCCUPANCY TIME IN CITY BUILDING BASED ON BIG DATA FOR AUTO CONTROL OF HEATING OR COOLING FOR ENERGY SAVING

(71) Applicant: Korea Electronics Technology Institute, Seongnam-si (KR)

(72) Inventors: Ki Woong Kwon, Seoul (KR); Sang Hun Kim, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 397 days.

(21) Appl. No.: 17/622,480

(22) PCT Filed: May 7, 2021

(86) PCT No.: PCT/KR2021/005696
§ 371 (c)(1),
(2) Date: Dec. 23, 2021

(87) PCT Pub. No.: WO2022/114414
PCT Pub. Date: Jun. 2, 2022

(65) Prior Publication Data
US 2022/0373207 A1    Nov. 24, 2022

(30) Foreign Application Priority Data
Nov. 30, 2020 (KR) .................. 10-2020-0163682

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/64* (2018.01); *G05B 19/042* (2013.01);
(Continued)

(58) Field of Classification Search
CPC ........ F24F 11/46; F24F 11/64; F24F 2120/10; G06N 20/00; G06F 18/23213; G05B 19/042; G05B 2219/2614
See application file for complete search history.

(56) References Cited

U.S. PATENT DOCUMENTS 8,630,741 B1 * 1/2014 Matsuoka ................ F24F 11/88
700/12
2009/0132568 A1   5/2009 Syeda-Mahmood et al.
(Continued)

FOREIGN PATENT DOCUMENTS

JP        8-61741 A        3/1996
KR  10-2019-0095586 A      8/2019
(Continued)

OTHER PUBLICATIONS

Korean Office Action issued on Apr. 26, 2022, in the counterpart Korean Application No. 10- 2020-0163682 (4 pages in English and 5 pages in Korean).

*Primary Examiner* — Shelby A Turner
*Assistant Examiner* — Xiuqin Sun
(74) *Attorney, Agent, or Firm* — NSIP Law (57) ABSTRACT

Provided are a system and a method for predicting an occupancy time of a user in a city building based on big data for auto control of heating or cooling for energy saving. The user occupancy time prediction system includes: a sensor configured to collect data regarding whether a user occupies a predetermined space in a building; a database configured to store the collected data; a data pre-processing unit configured to process the stored data into a format suitable for machine learning; and a prediction unit configured to input the processed data into a machine learning model, and to predict an expected unoccupancy time of the user regarding the predetermined space in the building. Accordingly, a user occupancy/unoccupancy time may be predicted by analyz- (Continued)

ing big data, and energy may be saved by adjusting a temperature of a heating or cooling device before the unoccupancy time.

18 Claims, 7 Drawing Sheets

(51) Int. Cl.
    *F24F 120/10*     (2018.01)
    *G05B 19/042*     (2006.01)
    *G06F 18/23213*     (2023.01)
    *G06N 20/00*     (2019.01)

(52) U.S. Cl.
    CPC ....... *G06F 18/23213* (2023.01); *G06N 20/00* (2019.01); *F24F 2120/10* (2018.01); *G05B 2219/2614* (2013.01)

(56) References Cited

U.S. PATENT DOCUMENTS

| | | | | |
|---|---|---|---|---|
| 2019/0041811 A1* | 2/2019 | Drees | ...................... | G05B 15/02 |
| 2019/0162433 A1* | 5/2019 | Desmet | ................... | F24F 11/30 |
| 2021/0081811 A1* | 3/2021 | Brown | ................ | G05B 19/042 |

FOREIGN PATENT DOCUMENTS

| | | | | |
|---|---|---|---|---|
| KR | 10-2169637 B1 | 10/2020 | | |
| WO | WO-2013043863 A1 * | 3/2013 | ............. | G05B 15/02 |

\* cited by examiner

SYSTEM AND METHOD FOR PREDICTING USER OCCUPANCY TIME IN CITY BUILDING BASED ON BIG DATA FOR AUTO CONTROL OF HEATING OR COOLING FOR ENERGY SAVING

CROSS REFERENCE TO RELATED APPLICATIONS

This application is a U.S. National Stage Application of International Application No. PCT/KR2021/005696, filed on May 7, 2021, which claims the benefit under 35 USC 119(a) and 365(b) of Korean Patent Application No. 10-2020-0163682, filed on Nov. 30, 2020, in the Korean Intellectual Property Office, the entire disclosure of which is incorporated herein by reference for all purposes.

TECHNICAL FIELD

The present disclosure relates to a system and a method for predicting a user occupancy time in a city building, and more particularly, to a system and a method for predicting an occupancy time of a user in a city building, based on big data, for auto control of heating or cooling for energy saving.

BACKGROUND ART

Related-art auto control of heating or cooling aims at improving users' comfortability by turning on/off power of a heating or cooling device, or changing a temperature based on a predicted preference temperature.

However, in order to improve users' comfortability, the heating or cooling device should be more frequently driven than usual. Therefore, the related-art auto control of heating or cooling may have a problem of excessive energy consumption.

Accordingly, there is a demand for a method for saving energy by predicting a building occupancy time of a user, and automatically adjusting the temperature of a heating or cooling device without user's manual intervention when unoccupancy is predicted.

DISCLOSURE

Technical Problem

The present disclosure has been developed in order to address the above-discussed deficiencies of the prior art, and an object of the present disclosure is to provide a system and a method for predicting a user occupancy time, which can save energy by determining whether a city building is occupied by a user through a detection sensor, predicting a building occupancy time of the user through big data learning, which uses accumulated occupancy data of the user, and automatically adjusting the temperature of a heating or cooling device without user's manual intervention when unoccupancy is predicted.

Technical Solution

According to an embodiment of the present disclosure to achieve the above-described object, a user occupancy time prediction system includes: a sensor configured to collect data regarding whether a user occupies a predetermined space in a building; a database configured to store the collected data; a data pre-processing unit configured to process the stored data into a format suitable for machine learning; and a prediction unit configured to input the processed data into a machine learning model, and to predict an expected unoccupancy time of the user regarding the predetermined space in the building.

In addition, the prediction unit may analyze occupancy and unoccupancy patterns of the user regarding the predetermined space in the building, and may predict the expected unoccupancy time.

In addition, the machine learning model may be trained with previous occupancy data of the user regarding the predetermined space in the building, and the prediction unit may cluster the previous occupancy data into two groups with reference to days of the week, and may cause the machine learning model to distinguish between a weekend and working days only with occupancy data without additional information inputted to the machine learning model.

In addition, the prediction unit may estimate a regular and repetitive time to go out with respect to each of the respective clustered groups.

In addition, when predicting the expected unoccupancy time, the prediction unit may use a K-means clustering scheme, and to cluster the processed data into two groups based on a Euclidean distance.

The prediction unit may calculate an optimal solution having a minimum sum of squares of distances of each occupancy data from a center point $\mu_i$ of each group, by using Equation 1 presented below, so that characteristics of days corresponding to one week are divided into two groups with respect to n number of occupancy data:

$$\mathrm{argmin}_{s} \Sigma_{i=1}^{k} \Sigma_{x \in s_i} \|x - \mu_i\|^2 \qquad \text{Equation 1}$$

The prediction unit may calculate an occupancy probability at a time t with respect to an individual cluster after clustering the occupancy data, by using Equation 2 presented below:

$$\frac{\text{occupied}_t}{n_t} \qquad \text{Equation 2}$$

where $n_t$ is the total number of data at a corresponding time t, and $\text{occupied}_t$ is the number of occupancy data at the corresponding time t.

When a machine learning model applying a non-linear regression scheme is used and h is a Kernel bandwidth value, the prediction unit may apply Kernel density estimation (KDE) by using Equation 3 presented below, in order to transform a discrete time probability regarding the calculated occupancy probability value $\hat{f}_h(x)$ into a continuous time probability:

$$\hat{f}_h(x) = \frac{1}{n} \sum_{i=1}^{n} K_h(x - x_i) = \frac{1}{nh} \sum_{i=1}^{n} K\left(\frac{x - x_i}{h}\right) \qquad \text{Equation 3}$$

In addition, an optimal bandwidth h for Kernel density estimation may be defined by using Equation 4 presented below when n is the number of data samples and σ is a standard deviation:

$$h = \left\{ 4 \frac{\sigma^5}{3n} \right\}^{\frac{1}{5}} \approx 1.06 \sigma n^{-1/5} \qquad \text{Equation 4}$$

According to another embodiment of the present disclosure, a user occupancy time prediction method includes the steps of: collecting, through a sensor, data regarding whether a user occupies a predetermined space in a building; storing the collected data in a database; processing, by a data pre-processing unit, the stored data into a format suitable for machine learning; and inputting, through a prediction unit, the processed data into a machine learning model, and predicting an occupancy time of the user regarding the predetermined space in the building.

According to still another embodiment of the present disclosure, a user occupancy time prediction system includes: a sensor configured to collect data regarding whether a user occupies a predetermined space in a building; a database configured to store the collected data; a data pre-processing unit configured to process the stored data into a format suitable for deep learning; and a prediction unit configured to input the processed data into a deep learning model, and to predict an occupancy time of the user regarding the predetermined space in the building.

According to yet another embodiment of the present disclosure, a user occupancy time prediction method includes the steps of: collecting, through a sensor, data regarding whether a user occupies a predetermined space in a building; storing the collected data in a database; processing, by a data pre-processing unit, the stored data into a format suitable for deep learning; and inputting, through a prediction unit, the processed data into a deep learning model, and predicting an occupancy time of the user regarding the predetermined space in the building.

Advantageous Effects

According to embodiments of the present disclosure as described above, a user occupancy/unoccupancy time may be predicted by analyzing big data which uses previous occupancy data of a user in a city building, and energy may be saved by adjusting a temperature of a heating or cooling device before the unoccupancy time. In addition, when the temperature of the heating or cooling device is adjusted before unoccupancy is predicted, the temperature is only changed to the extent that the user does not recognize inconvenience, and comfortability may be maintained or improved.

BEST MODE

Hereinafter, the present disclosure will be described in more detail with reference to the drawings.

If comfortability and energy saving are achieved through auto control of a heating or cooling device in a city building, occupants may have two effects of having convenience and reducing housing expenses.

The present disclosure may learn a life pattern of a user and may predict a user occupancy time in a city building in order to automatically control a heating or cooling device in the building, and may achieve energy saving by performing auto control (on/off, temperature setting) of the heating or cooling device before a predicted unoccupancy time, considering that user's comfortability may not greatly be reduced even if heating or cooling is reduced before an unoccupancy time since the building basically has insulation performance.

The present disclosure may use a machine learning model or a deep learning model to determine whether a user occupies in the future, based on previous occupancy data.

Specifically, the present disclosure may find an expected unoccupancy time by analyzing occupancy and unoccupancy patterns of the user, and may contribute to energy saving by controlling output of the heating or cooling device in advance by using the expected unoccupancy time.

Figure 1:
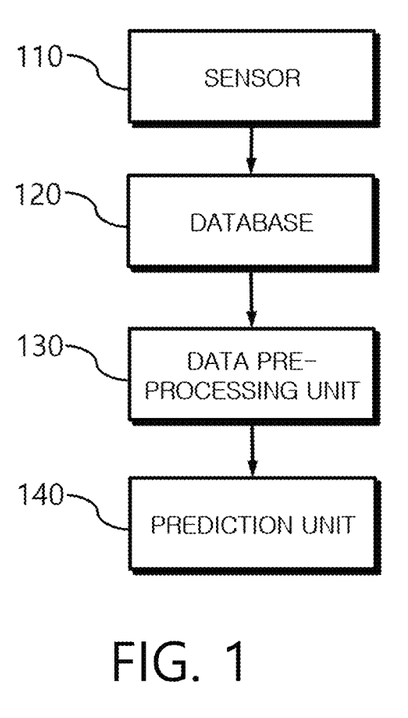
FIG. 1 is a view provided to explain a system for predicting a user occupancy time in a city building based on big data according to an embodiment of the present disclosure.

FIG. 1 is a view provided to explain a user occupancy time prediction system in a city building based on big data (hereinafter, referred to as a 'user occupancy time prediction system') according to an embodiment of the present disclosure.

The user occupancy time prediction system according to the present embodiment is provided to save energy by determining whether a city building is occupied by a user through a detection sensor, predicting a building occupancy time of the user through big data learning, which uses accumulated occupancy data of the user, and automatically adjusting the temperature of a heating or cooling device without user's manual intervention when unoccupancy is predicted.

To achieve this, the user occupancy time prediction system may include a sensor 110, a database 120, a data pre-processing unit 130, and a prediction unit 140.

The sensor 110 may collect data regarding user occupancy information of a predetermined space in the building.

Specifically, the sensor 110 may be implemented by an occupancy detection sensor (passive infrared (PIR), microwave) installed in each space in a building to determine whether the space is occupied by the user, and may detect whether a specific space in the building is occupied by the user during a predetermined time.

The database 120 may store the data collected through the sensor 110, and the data pre-processing unit 130 may process the stored data into a format suitable for machine learning or deep learning.

The prediction unit 140 may input the data which is processed into the format suitable for machine learning or deep learning into a machine learning model or a deep learning model, may predict an expected occupancy time and an expected unoccupancy time of the user regarding the predetermined space in the building, and may pre-control the temperature of a heating or cooling device in the building, based on a result of predicting.

The prediction unit 140 may configure a machine learning model, and may train with previous occupancy data regarding the predetermined space, and may predict an expected unoccupancy time by analyzing occupancy and unoccupancy patterns of the user regarding the predetermined space in the building.

That is, the prediction unit 140 may cluster previous occupancy data into two groups (a weekend group, a working day group) with reference to days of the week by using the trained machine learning model, such that the machine learning model distinguishes between the weekend and the working days only based on the occupancy data without additional information separately inputted thereto.

For example, the prediction unit 140 may estimate a regular and repetitive time to go out, such as going to work or going home from work, or going to school or returning home from school, with respect to each of the respective clustered groups, by using the trained machine learning model, and, when unoccupancy of the predetermined space by the user is predicted based on a result of predicting, the prediction unit 140 may automatically adjust the temperature of the heating or cooling device, thereby saving energy.

In this case, when predicting the expected unoccupancy time, the prediction unit 140 may use a K-means clustering scheme, and may cluster the processed data into two groups based on a Euclidean distance.

For example, the prediction unit 140 may calculate an optimal solution having a minimum sum of squares of distances of each occupancy data from a center point $\mu_i$ of each group, by using Equation 1 presented below, so that characteristics of days corresponding to one week are divided into two groups with respect to n number of occupancy data:

$$\mathrm{argmin}_s \Sigma_{i=1}^k \Sigma_{x \in s_i} \|x - \mu_i\|^2 \qquad \text{Equation 1}$$

By using Equation 1, characteristics of days corresponding to one week may be divided into 2 (n=2) groups.

Figure 2:
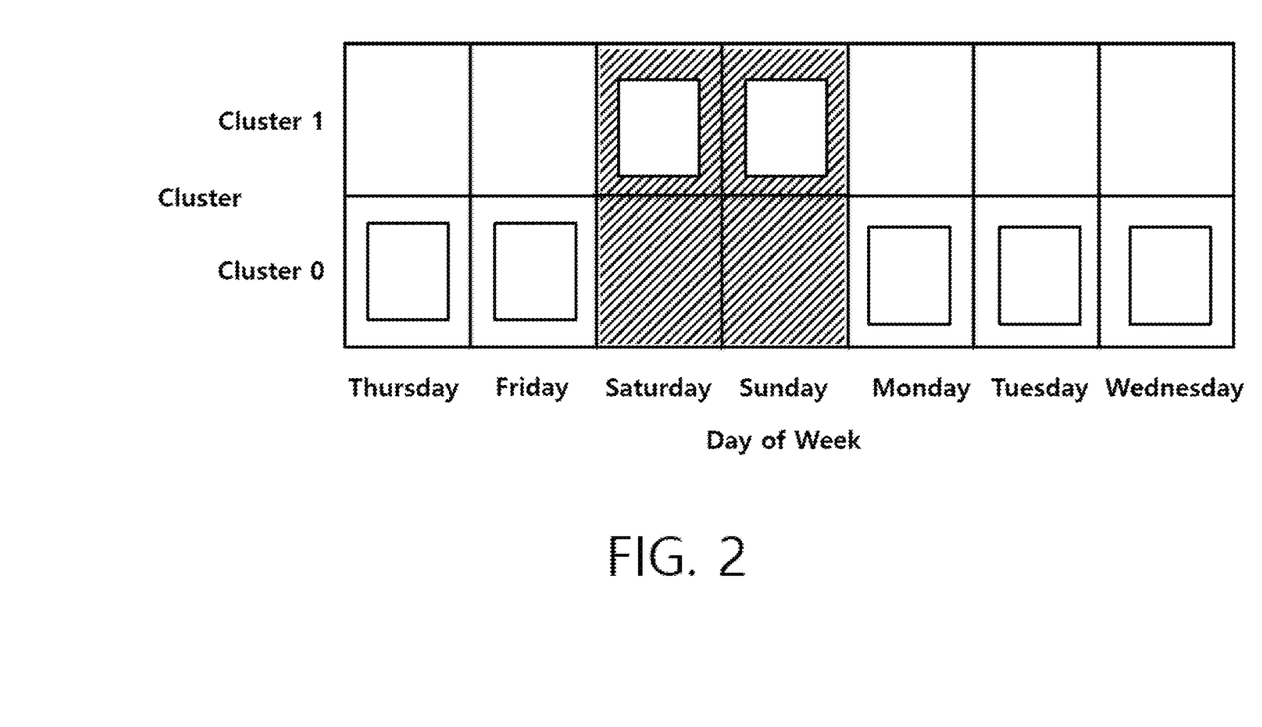
FIG. 2 is a view illustrating a result of classifying occupancy data into a weekday group and a weekend group by clustering.

FIG. 2 is a view illustrating a result of dividing occupancy data into a weekday group and a weekend group by clustering. FIG. 2 illustrates a result of dividing data of the weekdays into Cluster 0 and data of the weekend into Cluster 1.

The prediction unit 140 may calculate an occupancy probability with respect to an individual cluster after clustering the occupancy data, and in this case, may calculate an occupancy probability at a time t by using Equation 2 presented below:

$$\frac{\text{occupied}_t}{n_t} \qquad \text{Equation 2}$$

where $n_t$ is the total number of data at the corresponding time t, and occupied$_t$ refers to the number of occupancy data at the corresponding time t.

The occupancy probability values calculated based on the above equation include only limited measurement values regarding discrete time data, and thus a method for acquiring a more precise probability value is needed.

Accordingly, the prediction unit 140 may apply Kernel density estimation (KDE) by using Equation 3 presented below, in order to transform the discrete time probability regarding the calculated occupancy probability value $\hat{f}_h(x)$ into a continuous time probability:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right) \qquad \text{Equation 3}$$

The machine learning model used in this case may apply statistic-based machine learning technology such as support vector machine (SVM), and a Kernel bandwidth value may be indicated by h.

In addition, the optimal bandwidth h for Kernel density estimation may be defined by using Equation 4 presented below when n is the number of data samples and a is a standard deviation:

$$h = \left\{ 4\frac{\sigma^5}{3n} \right\}^{\frac{1}{5}} \approx 1.06\sigma n^{-1/5} \qquad \text{Equation 4}$$

The prediction unit 140 may use a deep learning model instead of the machine learning model in order to predict the occupancy probability. This will be described below with reference to FIGS. 4 to 7.

Figure 3:
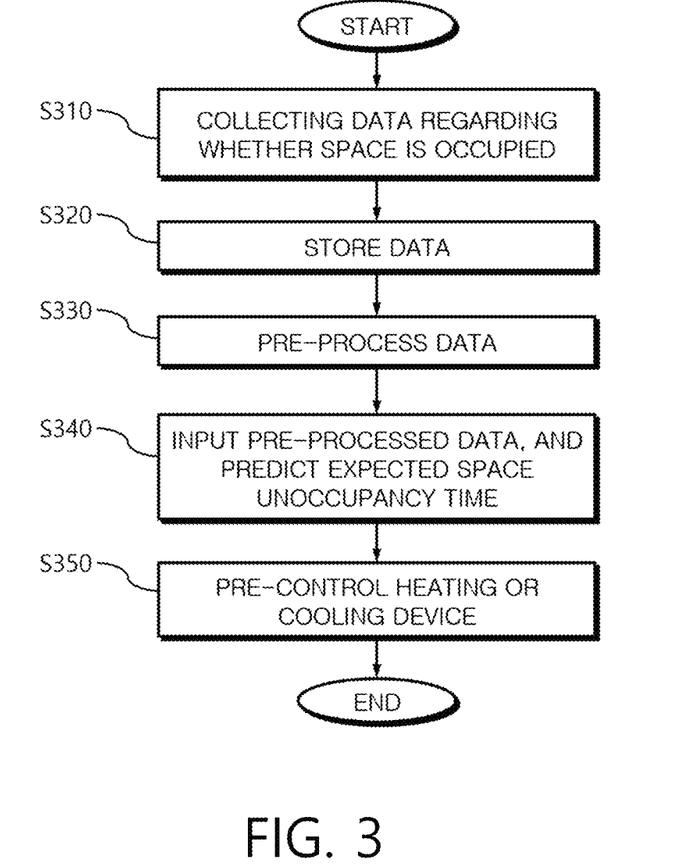
FIG. 3 is a view provided to explain a method for predicting a user occupancy time in a city building based on big data according to an embodiment of the present disclosure.

FIG. 3 is a view provided to explain a method for predicting a user occupancy time in a city building based on big data (hereinafter, referred to as a 'user occupancy time prediction method') according to an embodiment of the present disclosure.

The user occupancy time prediction method may collect data regarding user occupancy data of a predetermined space in a building (S310), and may store the data (S320) by using the user occupancy time prediction system described above with reference to FIGS. 1 and 2. In addition, in this case, outdoor temperature data of the building may also be collected and stored.

In addition, the stored data may be processed into a format suitable for machine learning or deep learning through the data pre-processing unit 130 (S330).

Thereafter, the method may predict an expected occupancy time and an expected unoccupancy time of the user regarding the predetermined space in the building through the prediction unit 140, by using a machine learning model or a deep learning model (S340), and may pre-control the temperature of a heating or cooling device in the building, based on a result of predicting (S350).

For example, when unoccupancy of the predetermined space by the user is predicted based on the result of predicting, the user occupancy time prediction method may save energy by automatically adjusting the temperature of the heating or cooling device.

Figure 4:
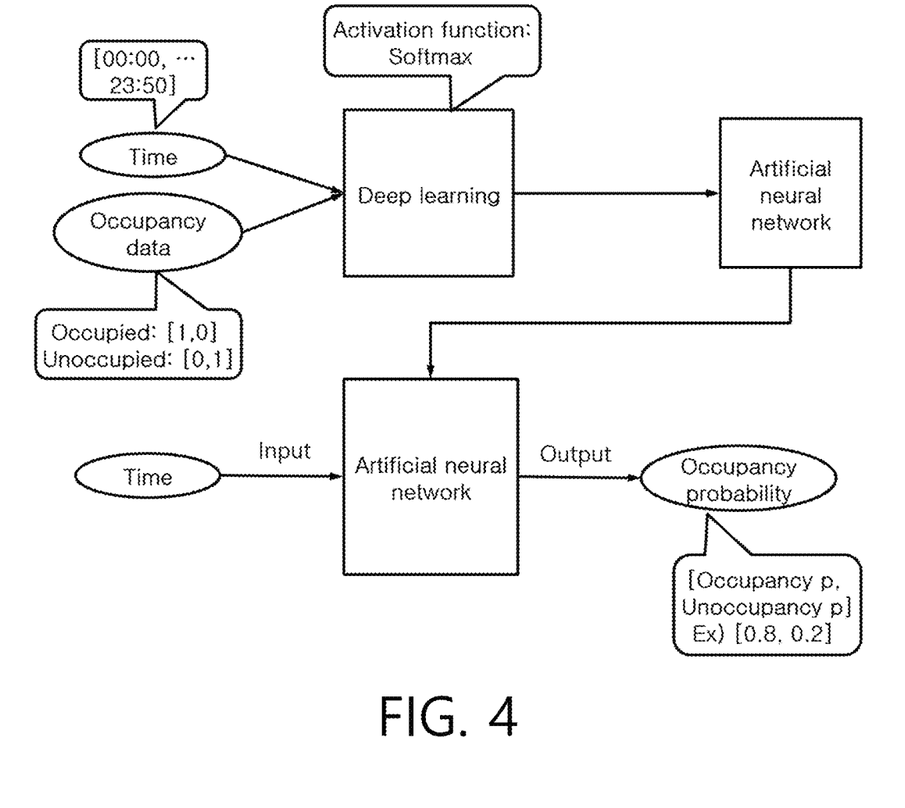
FIG. 4 is a view provided to explain a process of predicting an occupancy probability by using a deep learning model.

The prediction unit 140 may use the deep learning model instead of the machine learning model in order to predict an occupancy probability.

Specifically, the prediction unit 140 may train the deep learning model with discrete time data, and may predict a continuous time probability.

A process of acquiring the occupancy probability by utilizing the deep learning model is illustrated in FIG. 4.

For example, the prediction unit 140 may generate a deep learning model by training with data regarding time and occupancy and/or unoccupancy, and may input a time into the generated deep learning model as an input, and may calculate an estimated occupancy or unoccupancy value as an output.

In this case, when Softmax is used as an activation function of the deep learning model, the probability of occupancy and unoccupancy may be acquired as an output from the deep learning model.

Figure 5:
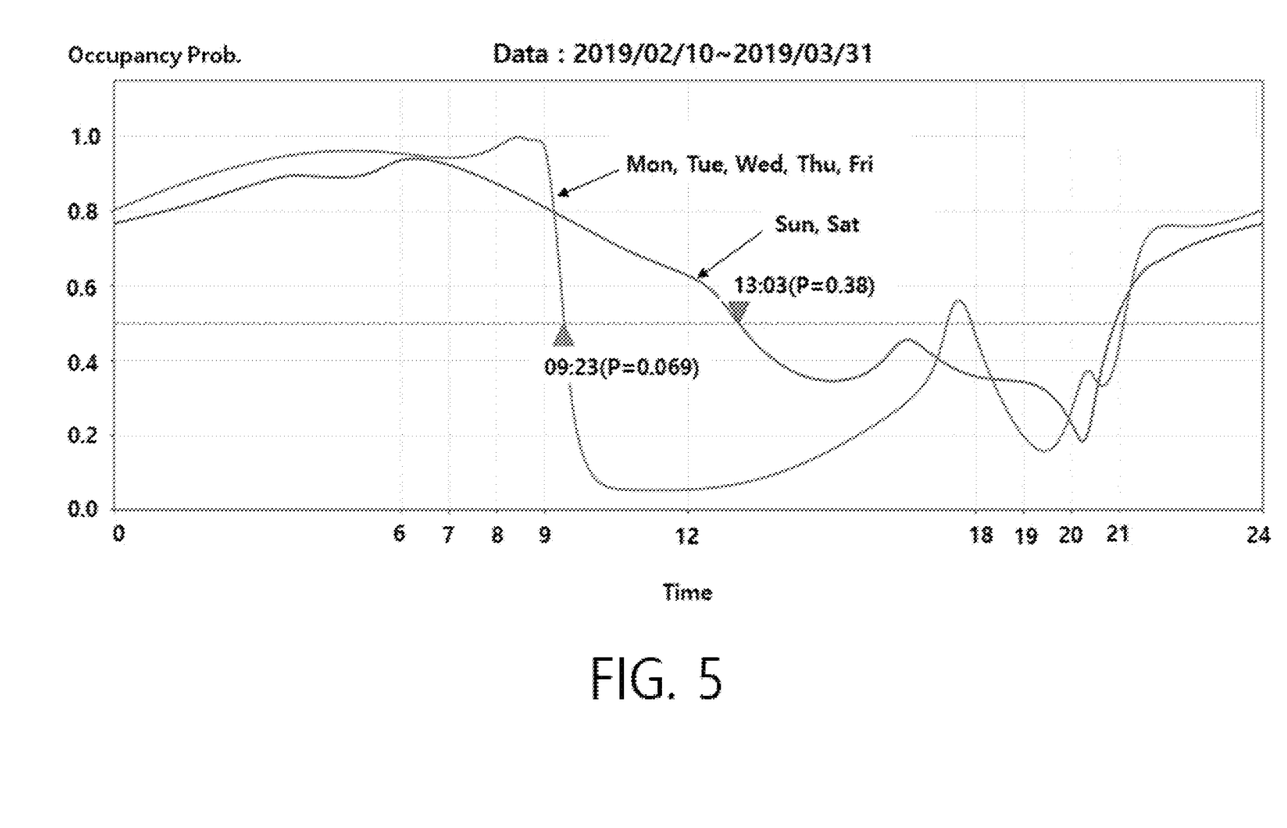
FIG. 5 is a view illustrating results of the occupancy probability predicting process illustrated in FIG. 4.

FIG. 5 is a view illustrating results of the occupancy probability prediction process illustrated in FIG. 4.

The prediction unit may cluster data into two groups through the above-described K-means clustering, and may train to learn the occupancy probability of each of the two groups, and may predict a point at which the occupancy probability of each group is greater than or equal to 0.5 or less than or equal to 0.5 with reference to a reference occupancy probability of 0.5, as a unoccupancy time.

In this case, as a result of predicting unoccupancy through training, it may be predicted that the space is unoccupied at 13:03 on Saturday and Sunday (green line), and is unoccupied from 09:23 on the other days (orange line). It may be determined that the corresponding space is a living space of the user, and the user goes to work around 9:23 a.m.

Figure 6:
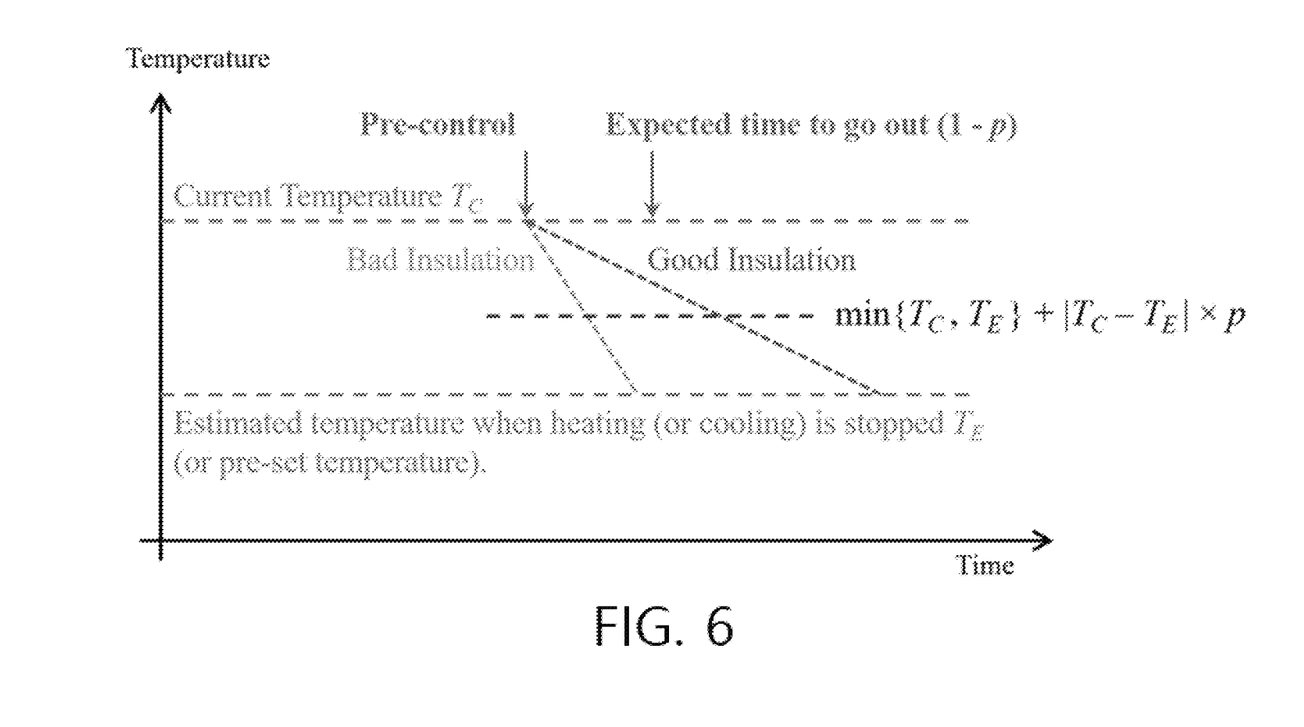
FIG. 6 is a view illustrating a threshold value in change of temperature when pre-control is performed, by using a result of predicting an expected unoccupancy time.

FIG. 6 is a view illustrating a threshold value in change of temperature when pre-control is performed by using a result of predicting an expected unoccupancy time.

Since a degree of insulation of an individual building is not known, the prediction unit 140 may set a threshold of control of temperature in order to avoid an abrupt change in temperature, which may be caused by control for energy saving, and may stop the control of heating or cooling for energy saving when the temperature is lower or higher than the threshold value after control of heating or cooling, and may maintain an appropriate temperature, thereby minimizing user's inconvenience.

The threshold value may be calculated by using Equation 5 presented below:

$$\text{Threshold} = \min\{T_C, T_E\} + |T_C - T_E| \times p \qquad \text{Equation 5}$$

where $T_C$ is a current temperature and $T_E$ is an estimated temperature when heating or cooling is stopped, and p indicates a user occupancy probability.

In addition, the prediction unit 140 may predict an indoor temperature by utilizing an outdoor temperature when heating or cooling is stopped since the indoor temperature is greatly influenced by the outdoor temperature when heating or cooling is stopped.

The outdoor temperature may be collected by using outdoor air temperature information of a weather center, or through a separate sensor.

Figure 7:
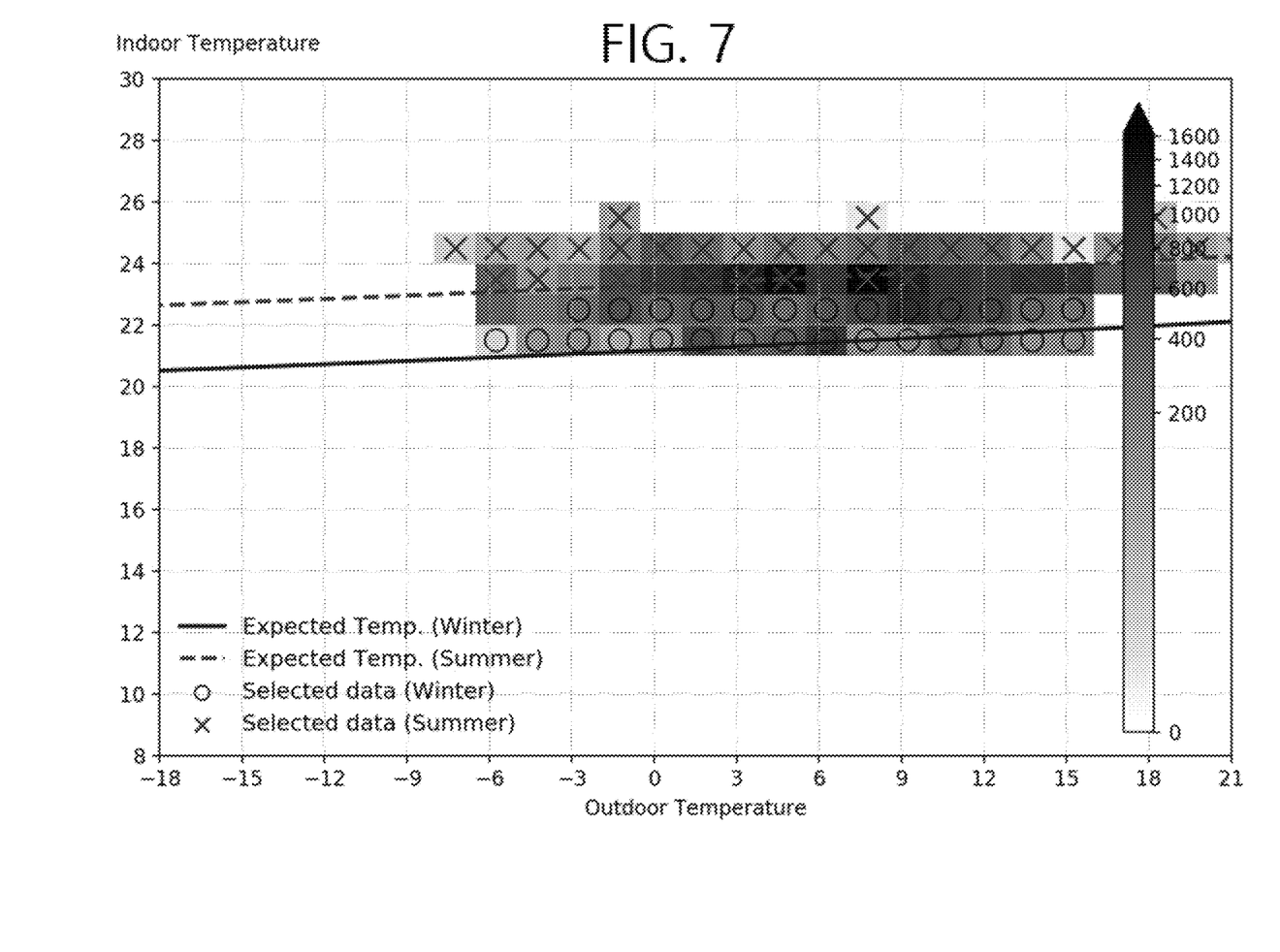
FIG. 7 is a view illustrating results of predicting temperature when heating or cooling is stopped.

Specifically, the prediction unit 140 may collect indoor temperature data by using outdoor temperature information of the weather center when heating or cooling is stopped, and may predict a temperature when heating or cooling is stopped, by curve-fitting the collected indoor temperature data in the form of a quadratic function.

FIG. 7 is a view illustrating a result of predicting a temperature when heating or cooling is stopped.

Herein, a 2-dimensional histogram indicates that there are more previous data as the histogram is darker, and there are less data as the histogram is brighter. The prediction unit may predict a temperature when heating or cooling is stopped, based on the previous occupancy data.

To summarize, the prediction unit 140 may pre-control a real heating or cooling device by using an expected unoccupancy time of the user and a threshold of heating or cooling control.

Specifically, when user unoccupancy is predicted, the prediction unit 140 may perform auto control of heating or cooling for energy saving 30 minutes before the predicted time, and may maintain an appropriate temperature not to increase or decrease by a heating or cooling control threshold or more.

In addition, when the user occupies until 30 minutes are elapsed after the predicted unoccupancy time, the prediction unit 140 may determine that the prediction of unoccupancy fails, and may return to a temperature set by the user or a preferred temperature. Through this, reduction of user's comfortability may be minimized.

In addition, the process of the prediction unit 140 pre-controlling the real heating or cooling device by using the heating or cooling control threshold may be equally applied not only to predicting an expected unoccupancy time of the user by using the deep learning model but also to predicting by using the machine learning model.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A user occupancy time prediction system comprising:
a sensor configured to collect data regarding whether a user occupies a predetermined space in a building;
a database configured to store the collected data;
a data pre-processing processor configured to process the stored data into a format suitable for training a neural network-based prediction model;
a prediction processor configured to input the processed data into the neural network-based prediction model, and to predict, using the neural network-based prediction model, an expected unoccupancy time of the user regarding the predetermined space in the building,
wherein the neural network-based prediction model is trained and configured to provide, as an output, an occupancy probability; and
a processor configured to perform control of operating a heating or cooling device based on the expected unoccupancy time predicted using the neural network-based prediction model, including performing an auto pre-control of operating the heating or cooling device before the expected unoccupancy time based on an unoccupancy or occupancy probability predicted using the neural network-based prediction model such that a temperature of the heating or cooling device is automatically adjusted without user's manual intervention when unoccupancy is predicted,
wherein the prediction processor is configured to calculate an occupancy probability at a time t with respect to an individual cluster after clustering occupancy data, by using Equation 1 presented below:

$$\frac{\text{occupied}_t}{n_t}, \qquad \text{Equation 1}$$

where $n_t$ is a total number of data at a corresponding time t, and occupied$_t$ is a number of occupancy data at the corresponding time t.

2. The system of claim 1, wherein the prediction processor is configured to analyze occupancy and unoccupancy patterns of the user regarding the predetermined space in the building, and to predict the expected unoccupancy time.

3. The system of claim 2, wherein the neural network-based prediction model is trained with previous occupancy data of the user regarding the predetermined space in the building, and
wherein the prediction processor is configured to cluster the previous occupancy data into two groups with reference to days of the week, and to cause the neural network-based prediction model to distinguish between a weekend and working days only with occupancy data without additional information inputted to the neural network-based prediction model.

4. The system of claim 3, wherein the prediction processor is configured to estimate a regular and repetitive time to go out with respect to each of the respective clustered groups.

5. The system of claim 3, wherein the prediction processor is configured to, when predicting the expected unoccupancy time, use a K-means clustering scheme, and to cluster the processed data into two groups based on a Euclidean distance.

6. The system of claim 5, wherein the prediction processor is configured to calculate an optimal solution having a minimum sum of squares of distances of each occupancy data from a center point $\mu_i$ of each group, by using Equation 2 presented below, so that characteristics of days corresponding to one week are divided into two groups with respect to n number of occupancy data:

$$\mathrm{argmin}_s \Sigma_{i=1}^k \Sigma_{x \in s_i} \|x - \mu_i\|^2 \qquad \text{Equation 2.}$$

7. The system of claim 6, wherein, when a machine learning model applying a non-linear regression scheme is used and h is a Kernel bandwidth value, the prediction processor is configured to apply Kernel density estimation (KDE) by using Equation 3 presented below, in order to transform a discrete time probability regarding the calculated occupancy probability value $\hat{f}_h(x)$ into a continuous time probability:

$$\hat{f}_h(x) = \frac{1}{n}\sum_{i=1}^{n} K_h(x-x_i) = \frac{1}{nh}\sum_{i=1}^{n} K\left(\frac{x-x_i}{h}\right). \qquad \text{Equation 3}$$

8. The system of claim 7, wherein an optimal bandwidth h for Kernel density estimation is defined by using Equation 4 presented below when n is the number of data samples and σ is a standard deviation:

$$h = \left\{4\frac{\sigma^5}{3n}\right\}^{\frac{1}{5}} \approx 1.06\sigma n^{-1/5}. \qquad \text{Equation 4}$$

9. A user occupancy time prediction method comprising:
collecting, through a sensor, data regarding whether a user occupies a predetermined space in a building;
storing the collected data in a database;
processing, by a data pre-processing processor, the stored data into a format suitable for training a neural network-based prediction model; and
inputting, through a prediction processor, the processed data into the neural network-based prediction model, and predicting, using the neural network-based prediction model, an occupancy time of the user regarding the predetermined space in the building,
wherein the neural network-based prediction model is trained and configured to provide, as an output, an occupancy probability; and
performing control of operating a heating or cooling device based on the expected occupancy time predicted using the neural network-based prediction model, including performing an auto pre-control of operating the heating or cooling device before the expected occupancy time based on an unoccupancy or occupancy probability predicted using the neural network-based prediction model such that a temperature of the heating or cooling device is automatically adjusted without user's manual intervention when unoccupancy is predicted,
wherein the prediction processor is configured to calculate an occupancy probability at a time t with respect to an individual cluster after clustering occupancy data, by using Equation 1 presented below:

$$\frac{\text{occupied}_t}{n_t}, \qquad \text{Equation 1}$$

where $n_t$ is a total number of data at a corresponding time t, and occupied$_t$ is a number of occupancy data at the corresponding time t.

10. A user occupancy time prediction system comprising:
a sensor configured to collect data regarding whether a user occupies a predetermined space in a building;
a database configured to store the collected data;
a data pre-processing processor configured to process the stored data into a format suitable for deep learning;
a prediction processor configured to input the processed data into a neural network-based prediction model, and to predict, using the neural network-based prediction model, an occupancy time of the user regarding the predetermined space in the building,
wherein the neural network-based prediction model is trained and configured to provide, as an output, an occupancy probability; and
a processor configured to perform control of operating a heating or cooling device based on the expected occupancy time predicted using the neural network-based prediction model, including performing an auto pre-control of operating the heating or cooling device before the expected occupancy time based on an unoccupancy or occupancy probability predicted using the neural network-based prediction model such that a temperature of the heating or cooling device is automatically adjusted without user's manual intervention when unoccupancy is predicted,
wherein the prediction processor is configured to calculate an occupancy probability at a time t with respect to an individual cluster after clustering occupancy data, by using Equation 1 presented below:

$$\frac{\text{occupied}_t}{n_t}, \qquad \text{Equation 1}$$

where $n_t$ is a total number of data at a corresponding time t, and occupied$_t$ is a number of occupancy data at the corresponding time t.

11. A user occupancy time prediction method comprising:
collecting, through a sensor, data regarding whether a user occupies a predetermined space in a building;
storing the collected data in a database;
processing, by a data pre-processing processor, the stored data into a format suitable for training a neural network-based prediction model;
inputting, through a prediction processor, the processed data into the neural network-based prediction model, and predicting, using the neural network-based prediction model, an expected occupancy time of the user regarding the predetermined space in the building,
wherein the neural network-based prediction model is trained and configured to provide, as an output, an occupancy probability; and
performing control of operating a heating or cooling device based on the expected unoccupancy time predicted using the neural network-based prediction model, including performing an auto pre-control of operating the heating or cooling device before the expected unoccupancy time based on an unoccupancy or occupancy probability predicted using the neural network-based prediction model such that a temperature of the heating or cooling device is automatically adjusted without user's manual intervention when unoccupancy is predicted,
wherein the prediction processor is configured to calculate an occupancy probability at a time t with respect to an individual cluster after clustering occupancy data, by using Equation 1 presented below:

$$\frac{occupied_t}{n_t} \quad \text{Equation 1}$$

where $n_t$ is a total number of data at a corresponding time t, and $occupied_t$ is a number of occupancy data at the corresponding time t.

12. The method of claim 11, further comprises analyzing occupancy and unoccupancy patterns of the user regarding the predetermined space in the building, and predicting the expected unoccupancy time.

13. The method of claim 12, wherein the neural network-based prediction model is trained with previous occupancy data of the user regarding the predetermined space in the building, and wherein the method further comprises clustering the previous occupancy data into two groups with reference to days of the week, and causing the neural network-based prediction model to distinguish between a weekend and working days only with occupancy data without additional information inputted to the neural network-based prediction model.

14. The method of claim 13, further comprises estimating a regular and repetitive time to go out with respect to each of the respective clustered groups.

15. The method of claim 13, further comprises, when predicting the expected unoccupancy time, using a K-means clustering scheme, and clustering the processed data into two groups based on a Euclidean distance.

16. The method of claim 15, further comprises calculating an optimal solution having a minimum sum of squares of distances of each occupancy data from a center point $\mu_i$ of each group, by using Equation 2 presented below, so that characteristics of days corresponding to one week are divided into two groups with respect to n number of occupancy data:

$$\operatorname{argmin}_s \Sigma_{i=1}^k \Sigma_{x \in s_i} \|x - \mu_i\|^2 \quad \text{Equation 2.}$$

17. The method of claim 16, wherein, when a machine learning model applying a non-linear regression scheme is used and h is a Kernel bandwidth value, the method further comprise applying Kernel density estimation (KDE) by using Equation 3 presented below, in order to transform a discrete time probability regarding the calculated occupancy probability value $\hat{f}_h(x)$ into a continuous time probability:

$$\hat{f}_h(x) = \frac{1}{n}\sum_{i=1}^n K_h(x - x_i) = \frac{1}{nh}\sum_{i=1}^n K\left(\frac{x - x_i}{h}\right). \quad \text{Equation 3}$$

18. The method of claim 17, wherein an optimal bandwidth h for Kernel density estimation is defined by using Equation 4 presented below when n is the number of data samples and σ is a standard deviation:

$$h = \left\{4\frac{\sigma^5}{3n}\right\}^{\frac{1}{5}} \approx 1.06\sigma n^{-1/5}. \quad \text{Equation 4}$$

* * * * *